(12) United States Patent
Jensen et al.

(10) Patent No.: US 10,837,675 B2
(45) Date of Patent: Nov. 17, 2020

(54) ANODE SUPPORT AND OR LOCATOR DEVICE AND METHOD OF ASSEMBLY

(71) Applicant: Rheem Australia Pty Limited, Rydalmere (AU)

(72) Inventors: Jim Jensen, Rydalmere (AU); Peter Robert Kerr, Rydalmere (AU); Juraj Gacsay, Rydalmere (AU); Anthea Knowles, Rydalmere (AU); Lee Kernich, Rydalmere (AU)

(73) Assignee: Rheem Australia Pty Limited, Rydalmere (AU)

( * ) Notice: Subject to any disclaimer, the term of this patent is extended or adjusted under 35 U.S.C. 154(b) by 312 days.

(21) Appl. No.: 15/802,037

(22) Filed: Nov. 2, 2017

(65) Prior Publication Data

US 2018/0106502 A1    Apr. 19, 2018

Related U.S. Application Data

(63) Continuation of application No. PCT/AU2016/050129, filed on Feb. 29, 2016.

(30) Foreign Application Priority Data

May 8, 2015    (AU) ................. 2015202488

(51) Int. Cl.
| | | |
|---|---|---|
| C23F 13/06 | (2006.01) | |
| F24H 1/20 | (2006.01) | |
| F24H 9/00 | (2006.01) | |
| F24H 9/06 | (2006.01) | |
| F24H 9/20 | (2006.01) | |
| C23F 13/18 | (2006.01) | |
| B23P 19/04 | (2006.01) | |

(Continued)

(52) U.S. Cl.
CPC ............ *F24H 9/2021* (2013.01); *B23P 19/04* (2013.01); *C23F 13/005* (2013.01); *C23F 13/18* (2013.01); *F17C 3/12* (2013.01); *F24H 9/0047* (2013.01)

(58) Field of Classification Search
None
See application file for complete search history.

(56) References Cited

U.S. PATENT DOCUMENTS 2,656,314 A * 10/1953 Osterheld ............... C23F 13/02
                                                                    204/196.11
3,037,925 A *  6/1962 Boucher ................. F24H 1/185
                                                                    204/196.16
(Continued)

FOREIGN PATENT DOCUMENTS

| CA | 1044759 | 12/1978 |
|---|---|---|
| CN | 201748683 | 2/2011 |

(Continued)

OTHER PUBLICATIONS

International Search Report for PCT/AU2016/050129 dated Apr. 19, 2016.

*Primary Examiner* — Joseph M. Pelham
(74) *Attorney, Agent, or Firm* — Troutman Pepper Hamilton Sanders LLP

(57) ABSTRACT

A water heater tank anode support and or locator device for an anode provided in a water heater tank, the support device having an anode engaging portion to engage said anode, and a tank engaging formation for operatively engaging a base of the tank.

19 Claims, 17 Drawing Sheets

(51) Int. Cl.
    *C23F 13/00*         (2006.01)
    *F17C 3/12*          (2006.01)

(56) References Cited

U.S. PATENT DOCUMENTS

| | | | | |
|---|---|---|---|---|
| 5,855,747 | A * | 1/1999 | Lusk | C23F 13/00 |
| | | | | 204/196.19 |
| 8,649,671 | B2 * | 2/2014 | Retiere | C23F 13/06 |
| | | | | 392/338 |
| 2007/0125640 | A1 | 6/2007 | Marcelino | |
| 2011/0064392 | A1 * | 3/2011 | Retiere | C23F 13/06 |
| | | | | 392/338 |

FOREIGN PATENT DOCUMENTS

| | | | | |
|---|---|---|---|---|
| EP | 1174529 A1 * | 1/2002 | | F24H 9/0047 |
| FR | 2396933 A1 * | 2/1979 | | C23F 13/02 |
| WO | WO 2001/007681 | 2/2001 | | |

\* cited by examiner

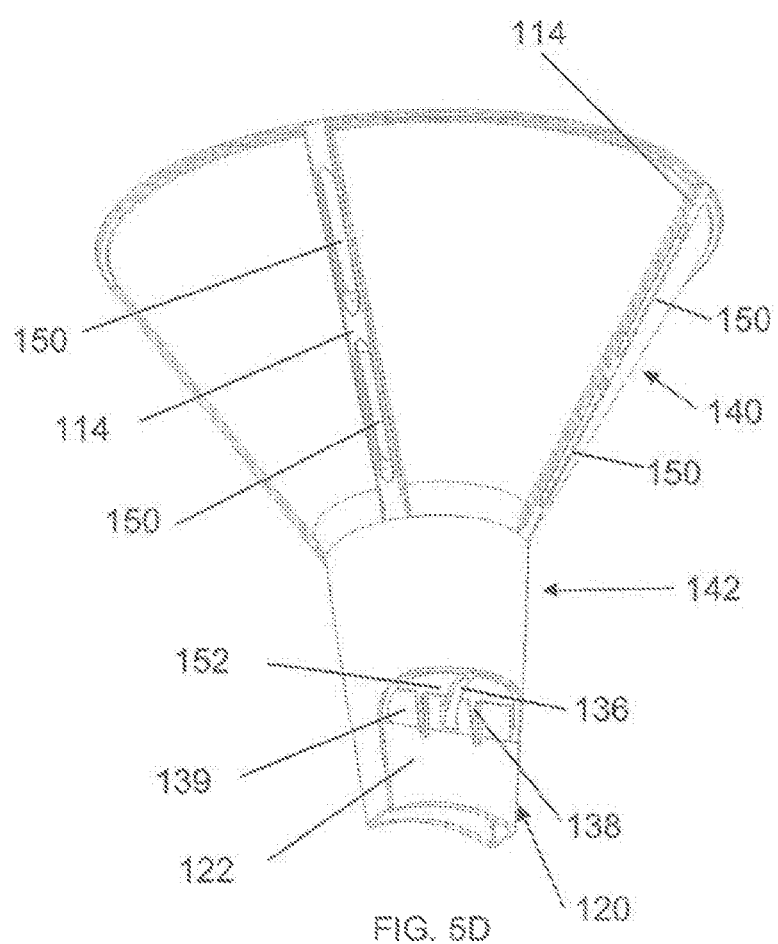

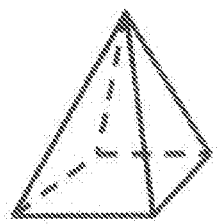
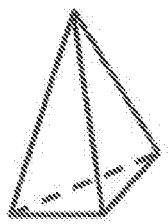
FIG. 17A  FIG. 17B
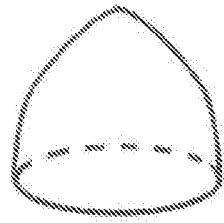
FIG. 17C  FIG. 17D
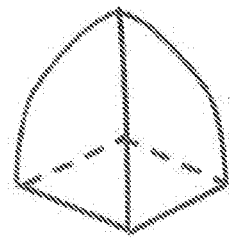
FIG. 17E  FIG. 17F

ANODE SUPPORT AND OR LOCATOR DEVICE AND METHOD OF ASSEMBLY

RELATED APPLICATIONS AND PRIORITY CLAIM

The present application is a national phase application of and claims priority to PCT application No. PCT/AU2016/050129 filed Feb. 29, 2016, which claims priority to Australian application number 205202488 filed May 8, 2015. The entirety of the foregoing applications are hereby incorporated herein by reference.

FIELD OF THE INVENTION

The present invention relates to an improved support device for a water heater tank anode, and a method of assembling a water heater tank.

BACKGROUND OF THE INVENTION

Water storage tanks are often made of ferrous material that is prone to corrosion. A typical example is a storage water heater. These tanks are usually cylindrical to withstand pressure. They are usually mounted vertically, but some specialised designs (e.g. rooftop solar water heater tanks) are oriented horizontally.

Water storage tanks are typically protected against internal corrosion by a protective layer of vitreous enamel and a sacrificial anode to protect any exposed metal surfaces. The stored water temperature, pressure, and the characteristics of these tanks vary, but eventually the tanks corrode with the resulting failure of the tank.

Some water storage tanks, particularly mains pressure storage water heater tanks, are cylindrical in shape with domed ends-sometimes minus and plus ends, sometimes plus and plus ends, and are of fully welded construction, and with minimal penetrations. They have welded fittings (e.g. ½" to 2" pipe thread size) for water inlet, outlet, anode and sometimes a temperature sensor. Electric water heaters also have a small welded flange fitting for fitment of an electric heating element. None of the holes described are large enough to permit entry of a hand for the fitment of an anode support after the tank is welded closed.

The anode is a rod, usually between 0.5 m to 2.0 m length depending on the size of the storage tank, with a male threaded fitting at one end. The anode rod is passed through a female fitting welded to the top enclosing face of the tank. The anode is rigidly attached to the tank by this threaded fitting, which is also a seal against the internal water pressure, and is thereby suspended in the volume of stored water. The long rod of metal is unsupported at the other (non-fitting) end.

The anode materials are magnesium or aluminium alloys which are relatively soft. The rods can be bent by sideways forces. This can damage the anode itself or cause the anode to impact other components, including the enamelled sides of the tank and the heating element.

The anodes are, however, sufficiently stiff to transmit forces through their cantilevered length to their mounting point—the welded female fitting on the end. This can cause the end to deflect, thereby cracking the brittle vitreous enamel and exposing metal surfaces to corrosion.

The resulting damage increases consumption of the sacrificial anode and causes premature failure of the storage tank.

Water heaters are transported from place of manufacture to place of installation by various modes of transport, all of which subject the water heater to vibration and shocks. It is recommended that the water heater be shipped in the vertical orientation to reduce bending loads on the anode, however this cannot be assured. Even when transported vertically, the water heater is subject to sideways shocks and vibration.

An anode support is used by Solahart to support the anode in horizontal solar water heaters. These supports are to prevent the anode drooping or downwardly angling during transport and service life. The design of the Solahart support requires access to the inside of the cylinder to fit the anode support. The anode cannot be fitted to the support without access to the inside of the cylinder through a substantially sized access hole Any reference herein to known prior art does not, unless the contrary indication appears, constitute an admission that such prior art is commonly known by those skilled in the art to which the invention relates, at the priority date of this application.

SUMMARY OF THE INVENTION

The present invention provides a water heater tank anode support and or locator device for an anode provided in a water heater tank, the support device having an anode engaging portion to engage said anode, and a tank engaging formation for operatively engaging a base of the tank.

The tank engaging formation can include a sleeve sized and shaped to fit onto a fitting attached to, or integrally formed with, said base.

The tank engaging formation can be elastically deformed while being mounted to said fitting, returning to its original shape once engagement is complete.

The tank engaging formation can include two sides spaced apart for the fitting to be accommodated therebetween, the two sides each having an internal shoulder formation extending interiorly, the internal shoulder formations being aligned with and extending toward each other, the internal shoulder formations being pushed apart from each other as they are passed over said fitting, then returning to their original positions to prevent the fitting from exiting the tank engaging formation.

The internal shoulder formation can be one of the following: a rounded or curved formation, a barb-shaped formation having a tapered edge and a squared edge.

The water heater tank anode support device can include one of the following:
a reinforcing formation adjacent said tank engaging formation to reinforce it;
a web provided around said tank engaging formation.

The anode engaging portion can have a mouth portion and a neck portion, a passage being defined there-between, the passage leading toward said tank engaging formation.

The mouth portion can converge toward the neck portion.

An inner diameter of the neck portion can decrease toward the tank engagement formation.

The mouth portion can have one of the following shapes: a semi-sphere or semi-ellipsoid, a frusto-cone, a pyramid with flat or curved lateral faces, a triangular-based pyramid with flat or curved lateral faces, a polygon-based pyramid with flat or curved lateral faces.

The mouth and neck portion can be constructed from one of the following: a substantially enclosed surface; a substantially open structure; a funnel type structure; a skeletal, mesh or cage type structure.

The neck portion can be generally cylindrical or tubular.

The water heater tank anode support device can have one or more apertures in said support device, so that moving particulate can pass there-through.

The anode engaging portion can include internal longitudinal ribs provided around and extending from an inner surface of said anode engaging portion, the internal longitudinal ribs defining said inner diameter of the anode engaging portion.

The neck can have at least one through aperture adjacent said tank engagement formation.

The present invention also provides a method of supporting an anode in a water storage tank, wherein a free end of the anode is supported by a base of the tank.

The base can have attached to it a water heater tank anode support device mentioned in the paragraphs above, the support device being aligned with and supporting the anode.

The present invention also provides a method of assembling a water storage tank, the method including attaching an anode to an upper assembly of the tank, attaching an anode support device to a base of the tank, aligning the anode support device with the anode, assembling the base and the upper assembly whereby a free end of the anode is inserted into the anode support device, joining the base to the upper assembly.

The anode can be centrally located with respect to the upper assembly, and the anode support device is centrally located with respect to the base.

The anode can be offset from a centre of the upper assembly, and the anode support device is likewise offset from a centre of base, to generally align with the anode during assembly.

BRIEF DESCRIPTION OF THE DRAWINGS

An embodiment or embodiments of the present invention will now be described, by way of example only, with reference to the accompanying drawings, in which:

FIG. 5D is a perspective view of another embodiment of the water heater tank anode support device;

FIGS. 17A to 17F depict some alternative shapes which can be taken by the mouth portion of the anode engaging portion.

DETAILED DESCRIPTION OF THE EMBODIMENT OR EMBODIMENTS

Figure 1:
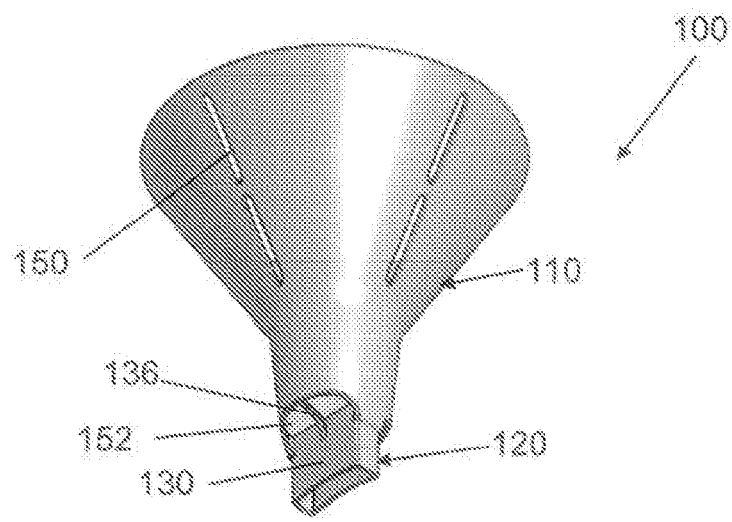
FIG. 1 is a perspective view of a water heater tank anode support device.
Figure 2:
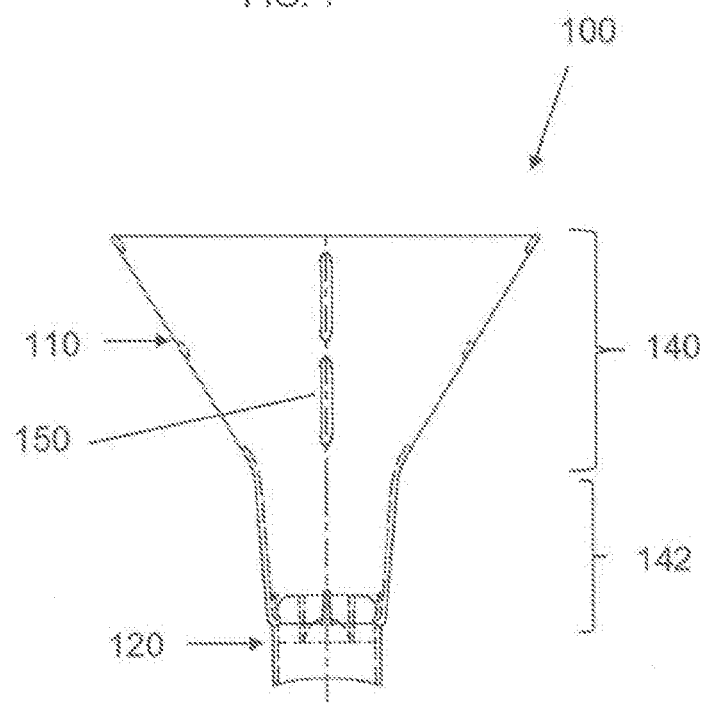
FIG. 2 is a cross section of the water heater tank anode support device depicted in FIG. 1.

FIGS. 1 and 2 depict a water heater tank anode support device 100. The anode support device 100 is adapted to receive and or dampen the unsupported end of a suspended anode against oscillations of a predetermined magnitude. In a preferred embodiment, it is a funnel shaped plastic moulding which is attached to the base of the tank, at the end opposite to the anode fitting end. In the preferred embodiment, the anode support is clipped on to a welded ring on the minus end of a vertical enamelled water heater. However the shape of the base of the tank onto which the anode support can be fitted is not limited to minus ends, and other shaped ends can utilise the anode support The support device 100 has an anode engaging portion 110 to engage the free end of the anode. The anode engaging portion 110 has an inner passage which is dimensioned to allow it to accommodate the anode (not shown). Optionally, the anode engaging portion 110 includes through apertures 150, for moving particulates, such as eroded material from the anode, to fall through.

In the embodiments shown in FIGS. 1, 2, 5A to 5D and 8, the support and locator device 100 includes a smooth internal surface 116. FIGS. 5A to 5D further show the support and locator device 100 includes external ribs or fins 114 which extend longitudinally or axially along the exterior of the anode engaging portion 110. The external ribs 114 help to strengthen or reinforce the support and locator device 100. The external ribs 114 are evenly spaced apart. The through apertures 150 for the particulates to fall through are provided through the external ribs 110 and through the internal surface 116. As seen in FIG. 5A to 5D, the apertures 150 are elongated slots extending longitudinally along the external ribs 114. Each rib has two or more (two depicted) apertures 150.

Figure 3:
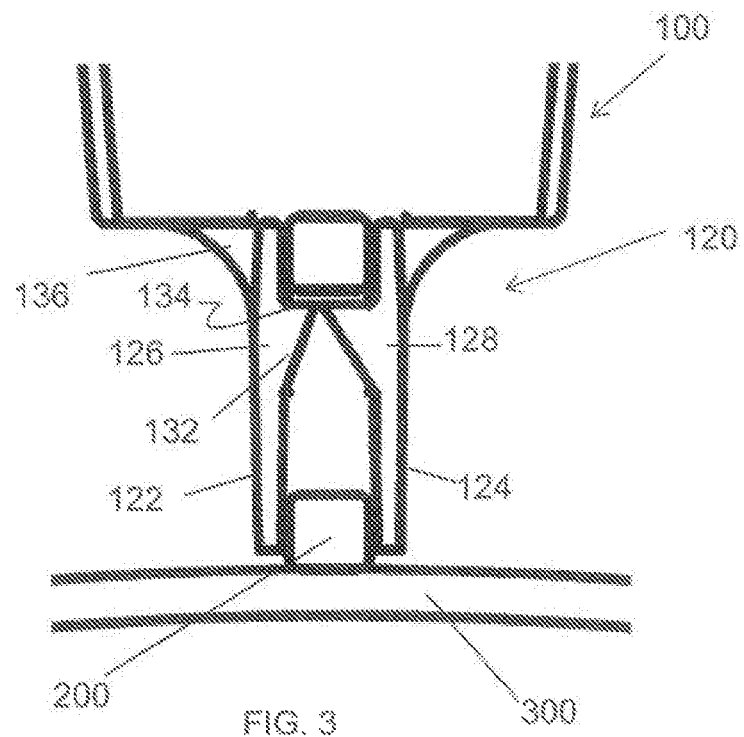
FIG. 3 is cross section of tank engagement portion that is in engagement with a fitting formation on a base of a tank.

The support device 100 has a tank engaging formation 120 for operatively engaging a fitting on the base of the tank (shown, for example, in FIG. 3). Referring to FIGS. 1 and 3, the tank engaging formation 120 includes a sleeve 130 which is dimensioned to fit onto a fitting 200 attached to the tank base 300. A web 136 is provided around the sleeve 130 to reinforce the tank engaging formation 120.

The tank engaging formation 120, more particularly the sleeve 130, is sized and shaped to be elastically deformed while being mounted to the fitting 200, returning to its original shape once engagement is complete. In the embodiments shown in FIGS. 3 and 4, the tank engaging formation 120 is adapted to engage a loop fitting 200 on the tank of the base. The tank engaging formation 120 includes two longitudinal sides 122, 124 which are spaced apart for the fitting 200 to fit there-between. The two sides 122, 124 have aligned internal shoulder formations or protrusions 126, 128 that extend interiorly. The internal shoulder formations 126, 128 are therefore aligned with and extend toward each other.

At their closest, the maximum separation between the internal shoulder formations 126, 128 is smaller than the width of the ring or loop fitting 200. When the support device 100 is fit over the fitting 200, the internal shoulder formations 126, 128 ride over the fitting 200 and are pushed apart from each other as they are passed over the fitting. The internal shoulder formations 126, 128 then return to their respective original positions, becoming once again close to each other. Now in the returned positions, the internal shoulder formations 126, 128 capture the tank base fitting 200, preventing the tank base fitting 200 from exiting the tank engaging formation 120.

In preferred embodiments, the shape of the internal shoulder formation 126, 128 corresponds to the shape of the tank base fitting 200, to facilitate the internal shoulder formation 126, 128 riding over and catching the tank base fitting 200. For instance, the internal shoulder formation 126, 128 shown in FIG. 3 is intended to cooperate with a loop fitting 200 having a rectangular or square cross section. Therefore, the internal shoulder formations 126, 128 are barb-shaped formations or protrusions. Each formation 126, 128 has a tapered edge 132 which is operative located closer to the tank base 300, and a squared edge 134 which is operatively located farther from the tank base 300. The tapered edges 132 converge toward the direction of the anode engaging portion 110 so that the tapered edges 132 are pushed apart by the loop fitting 200 as they ride over the fitting 200. Once the fitting 200 clears the tapered edges 132, it is captured by the squared edges 134 and prevented from exiting the tank engaging portion. The shape of the squared edges 134 cooperates with the shape of the loop fitting 200.

Figure 4:
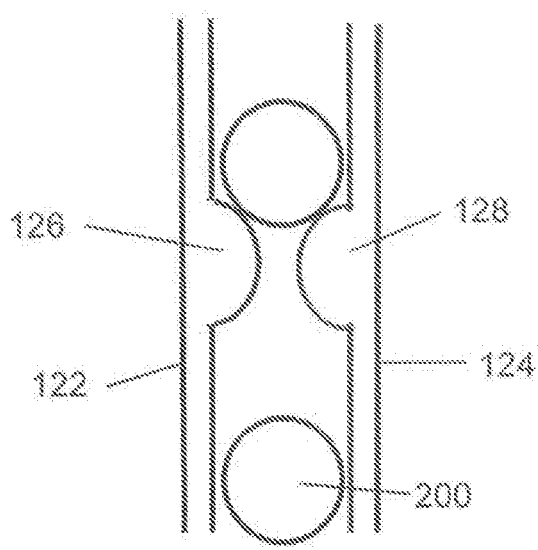
FIG. 4 is partial cross section of another tank engagement portion that is in engagement with a different fitting formation on a base of a tank.
Figure 5A:
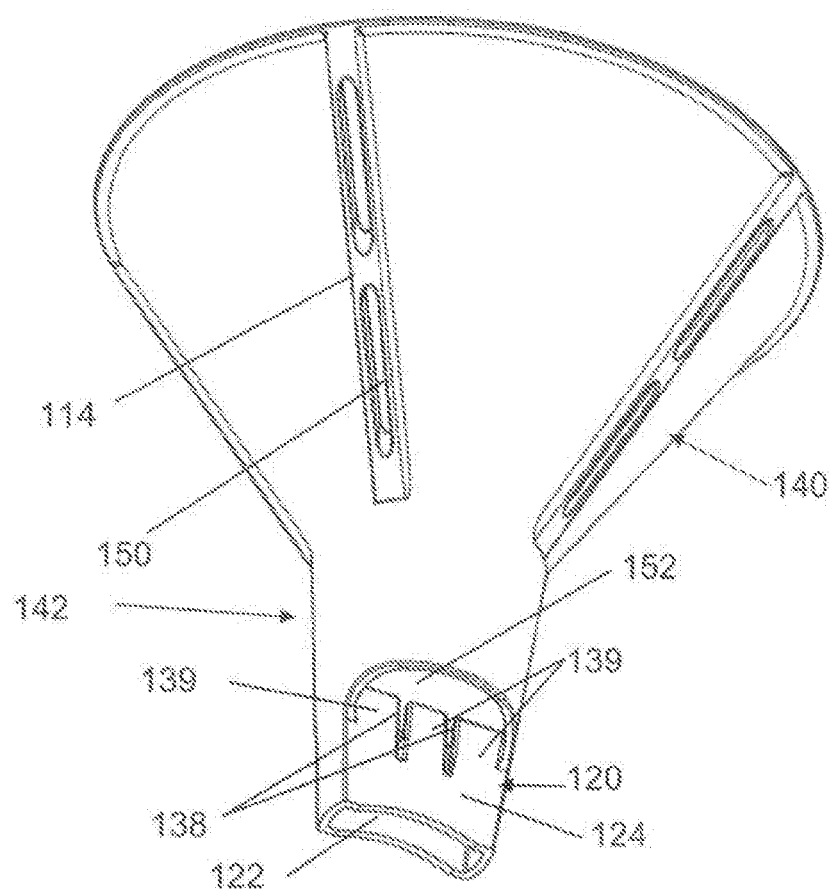
FIG. 5A is a perspective view of another embodiment of the water heater tank anode support device.
Figure 5B:
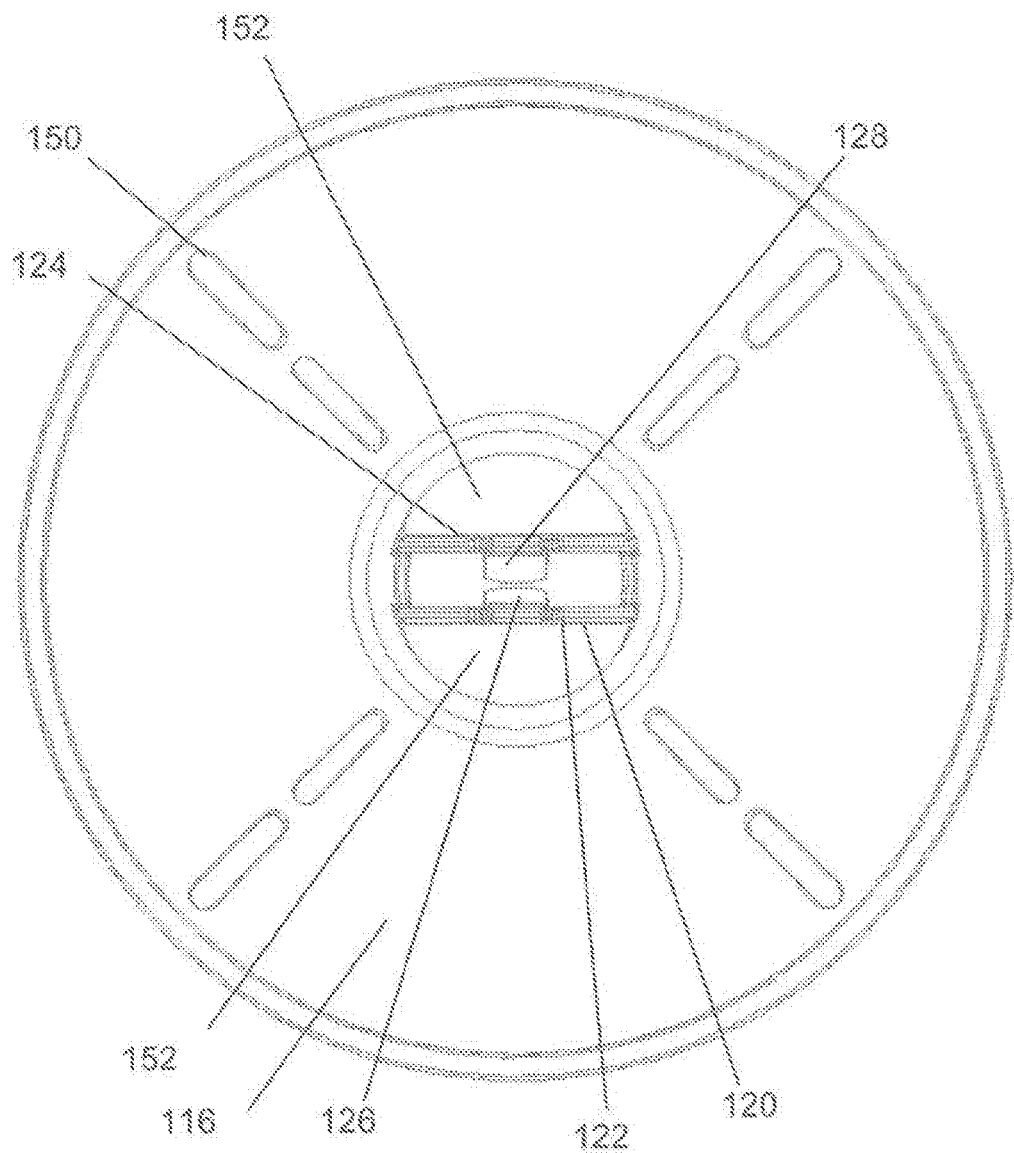
FIG. 5B is a top view of the water heater tank anode support or locator device depicted in FIG. 5A.
Figure 5C:
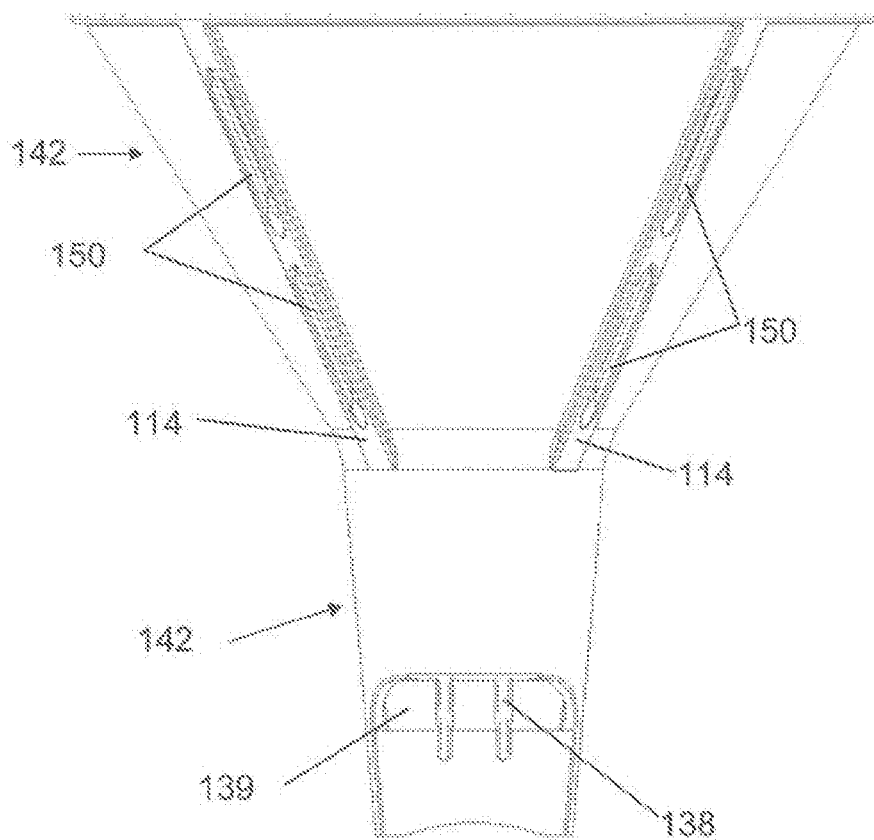
FIG. 5C is a side view of the water heater tank anode support or locator device depicted in FIG. 5A.

In cases where the loop fitting 200 has a rounded cross section, the internal shoulder formations 126, 128 can be rounded or curved formations, as such those shown in FIG. 4, to cooperate with rounded fittings 200. The protrusions 126, 128 shown in FIG. 5C further have rounded side profiles, observable from the top view. The rounded side profiles further helps the protrusions 126, 128 to ride over the tank base fitting 200.

During installation of the support device 100 on the tank base 300, the tank engaging formation 120 is loaded by being pushed apart by the tank base fitting 200. As shown in FIG. 3, the support device further includes reinforcing formations either in or adjacent the tank engaging formation 120, to reinforce it against the transmitted forces caused by the loading or any vibratory force. For example, as shown in FIG. 1, a web 136 can be provided around the tank engaging formation 120. The web 136 is an elastically deformable material, so that the springiness of the web 136 helps support the tank engaging formation 120. The tank engaging formation 120 can be otherwise reinforced. For example, as shown in FIG. 5, in place of the web, the reinforcing formation instead has slits or slots 138, provided between flexible tabs 139 which extend from the sides 122, 124 of the tank engaging formation 120, to improve the springiness of the tank engaging formation 120. In the embodiment shown in FIG. 5D, both the web 136 and the tabs 139 are included.

The water heater tank anode support device 100 is shaped so as to be self-centering, when the support for and anode are assembled. Referring to FIGS. 2 and 5A to 5D, the anode engaging portion 100 has a mouth portion 140 and a neck portion 142. The external ribs 114 extend along the mouth portion 114. The tank engagement formation 120 can be a continuation from the neck portion (e.g. FIG. 1) or a part of the neck portion 142 (e.g. FIGS. 5A to 5D). The mouth or neck portion, or both, can be constructed from a substantially enclosed surface, a substantially open structure, a funnel type structure, or a mesh or cage type structure. A passage is defined between the mouth and neck portions 140, 142 for the anode to pass through. The passage leads toward the tank engaging formation 120. The anode engaging portion 110 is generally funnel-shaped, with the mouth portion 140 converging toward the neck portion 142. The mouth portion 140 can have a generally decreasing width as measured across a longitudinal axis of the anode engaging portion 110. The neck portion 142 is generally cylindrical or tubular. It further has an inner dimension (or in the case of a neck portion 142 having a rounded profile, an inner diameter) that decreases toward the tank engaging formation.

Figure 6A:
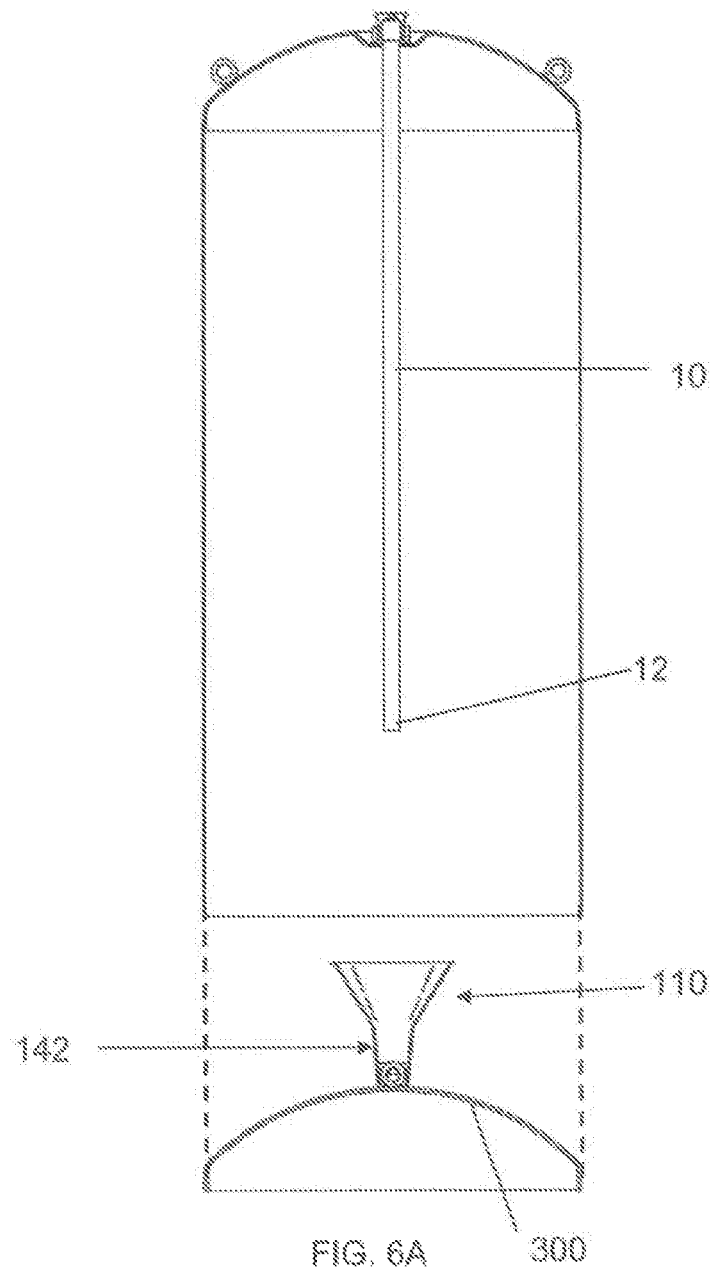
FIG. 6A is a cross section view showing a vertical alignment between an upper assembly of a water heater tank and a base of the water heater thank which has an anode support device attached.
Figure 6B:
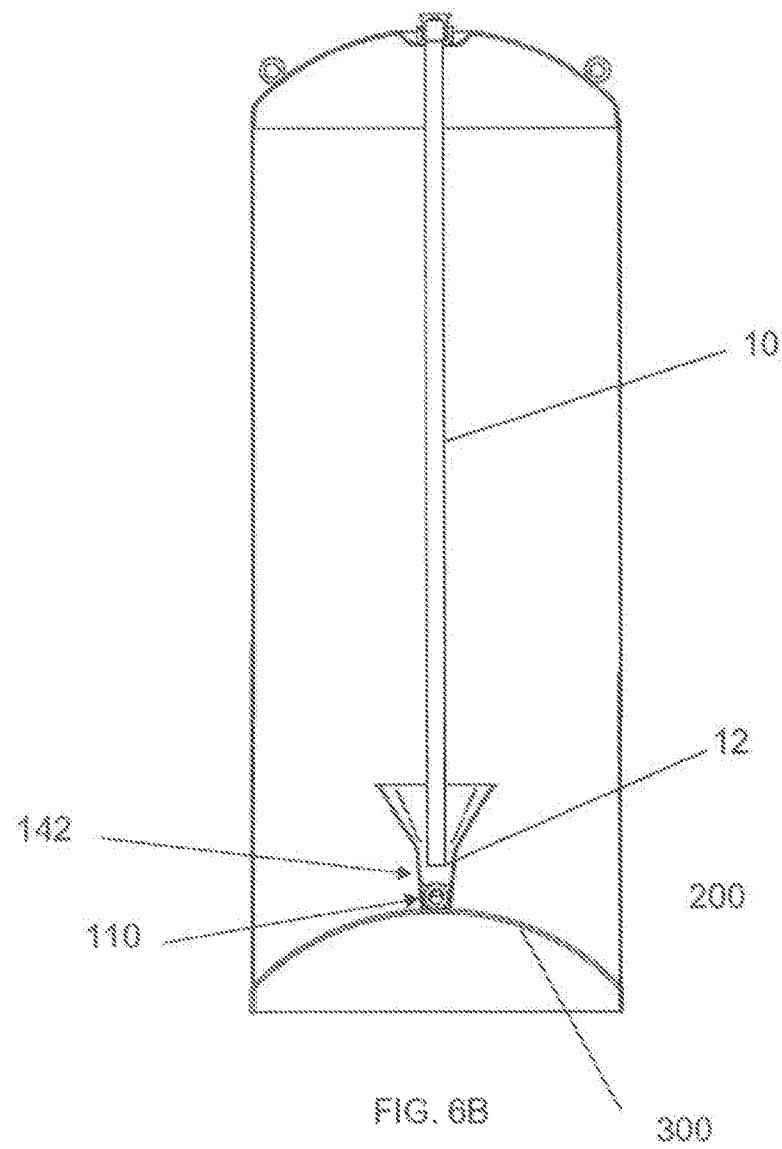
FIG. 6B depicts the water heater tank assembly shown in FIG. 6A, in which the upper assembly and the base are assembled.

As shown in FIGS. 6A to 8, the mouth portion 140 is wide enough to accommodate for variations or imprecision in the location of the anode 10. Preferably, as shown in FIGS. 6A and 6B, the anode 10 aligns with the support or locator device 100 so as to be received in the neck portion 142. In cases where the anode (usually mounted to the top of the water heater tank) does not align with the anode support device 100, the suspended end 12 of the anode 10 is guided or self-aligns toward the middle of the support device 100 by the surface of the support device 100. In this regard the support device is self-centering. The anode 10 is be chamfered on the suspended end 12 to further ease installation and avoid a sharp corner on the anode "catching" on the anode support device 100. This permits an anode 10 to move into the anode support 100 and self-align in the anode support 100. Self-alignment is desired because the tank end fitting axis from the upper tank assembly may not direct the anode rod precisely to a predetermined location due to manufacturing variation. The conical shape in the depicted embodiment also accommodates small variations in relative anode and tank lengths.

Figure 7:
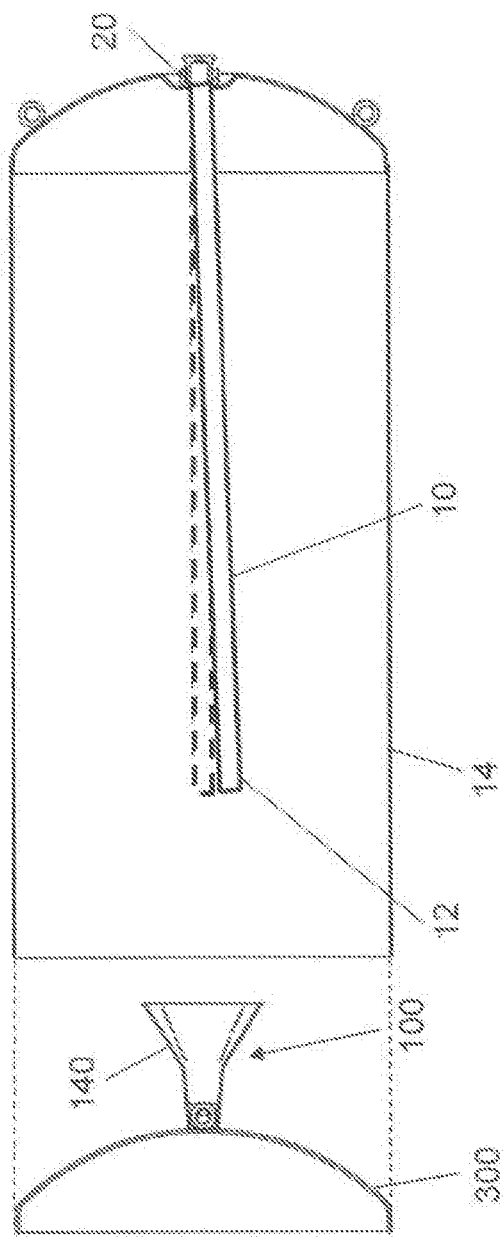
FIG. 7 is a cross section view showing a horizontal alignment between an upper assembly of a water heater tank and a base of the water heater thank which has an anode support device attached.

In FIG. 7, the tank is shown as being horizontally oriented. Because of its length, the suspended end 12 of the anode 10, in this orientation, can angle downwards from its mounting point 20 at the top assembly 14, and thus become off-set from the tank's axis. The self-aligning device 100 will accommodate the off-set during installation of the tank base 300 onto the tank's upper assembly 14.

Exemplary dimensions are provided herein. The funnel shape of the anode engaging portion 110 can have a top diameter of about 120 mm, a length of about 75 mm, with an almost cylindrical neck section of about 1.5 times the diameter of the largest anode. In the preferred embodiment, one anode support is suited to tank types and sizes from 125 L to 400 L capacity.

Figure 8:
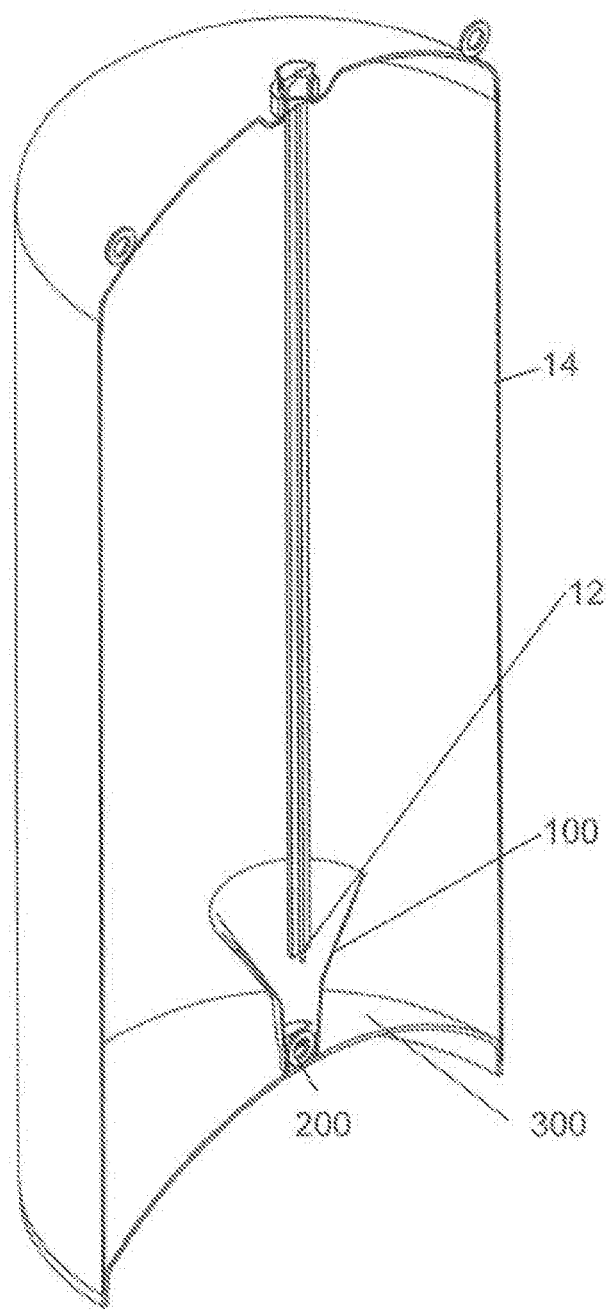
FIG. 8 is a perspective cross section of an assembled water heater tank with the water heater tank anode support device attached.
Figure 9:
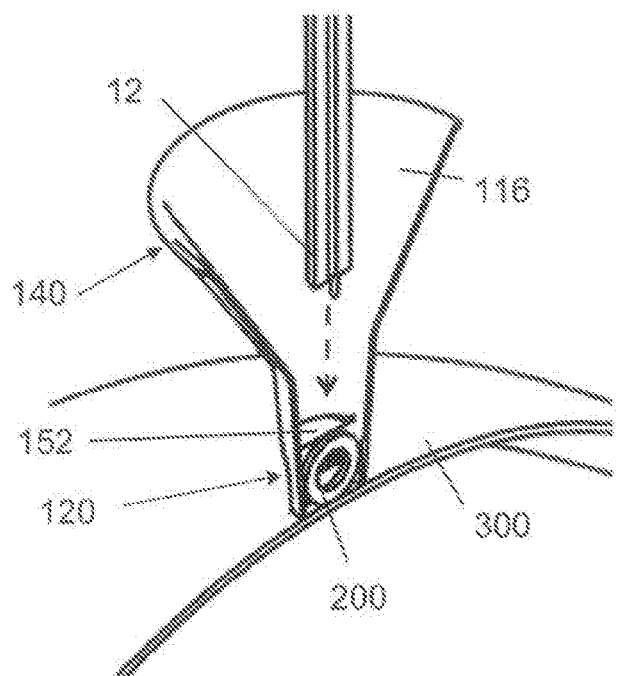
FIG. 9 is a partial enlargement of FIG. 8, showing the suspended end of the anode being and the water heater tank anode support device.

FIGS. 8 and 9 depict a water tank assembly having a sacrificial anode 10 and an anode locator device 100. It is preferred that the anode 10 extends into the neck portion 142 to be held there. However, even in cases where the anode 10 only reaches the extent of the mouth portion 140 of the anode support device 110, the size of the mouth portion 140 limits the amount of oscillations of the suspended end 12 that is permitted.

Figure 9A:
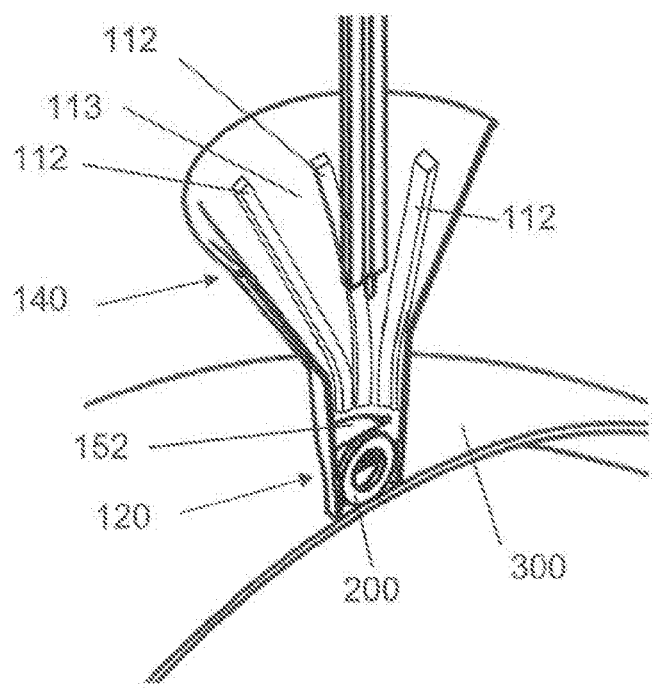
FIG. 9A is a partial perspective view of a water heater tank anode support device which has internal ribs.
Figure 10:
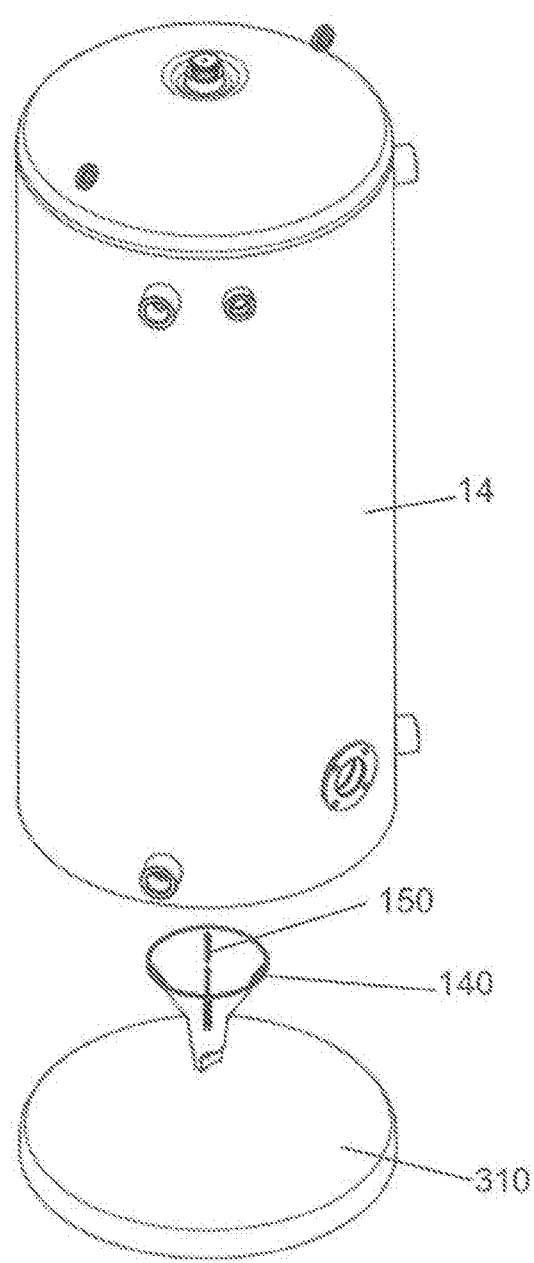
FIG. 10 is a perspective view of a water heater tank assembly having a flat base, with a water heater tank anode support device attached.

In FIGS. 8, 9, and 9A, the water tank anode support device 100 is shown as being attached to a tank base that is a minus end. FIG. 9A is similar to FIG. 9, except it depicts an embodiment having internal ribs 112, whereas FIG. 9 depicts an embodiment having a smooth internal surface 116. Optional internal ribs or fins 112 (see FIG. 9A) extend longitudinally or axially along the anode engaging portion 110, the longitudinal direction being defined along the axis of insertion for the anode. The internal ribs 112 therefore define the inner dimension of the anode engaging portion 110, i.e. the dimension of the anode engaging portion's inner passage. When the support device 100 is operatively oriented (e.g. vertically), the space 113 between the internal ribs 112 also provides room for the moving particulates to fall through optional apertures 152 located at the lower part of the anode engaging portion 110. Further the water tank anode support device 100 can also be used with tank bases having other configurations. For example, FIG. 10 depicts a water tank assembly having a substantially flat base 310 with the water tank anode support device 100 attached.

Referring back to FIGS. 1, 2, and 5, the anode support device 100 also has apertures, holes or slots 150 and 152. The apertures, holes or slots 150 and 152 are of sufficient size to permit moving particulates to fall through. The moving particulars may be a fine material that is the by-product of anode depletion. Without the apertures, the material would settle around the end of the anode thereby reducing its exposed area and effectiveness.

In embodiments where the anode support device 100 is a substantially enclosed construction or structure, such as that shown in FIG. 1, the support device 100 has a sidewall that encloses a passage space, with the apertures being provided through the side wall. The apertures are in particular provided in the mouth portion. Such apertures are longitudinally extending slits or slots.

Figure 11:
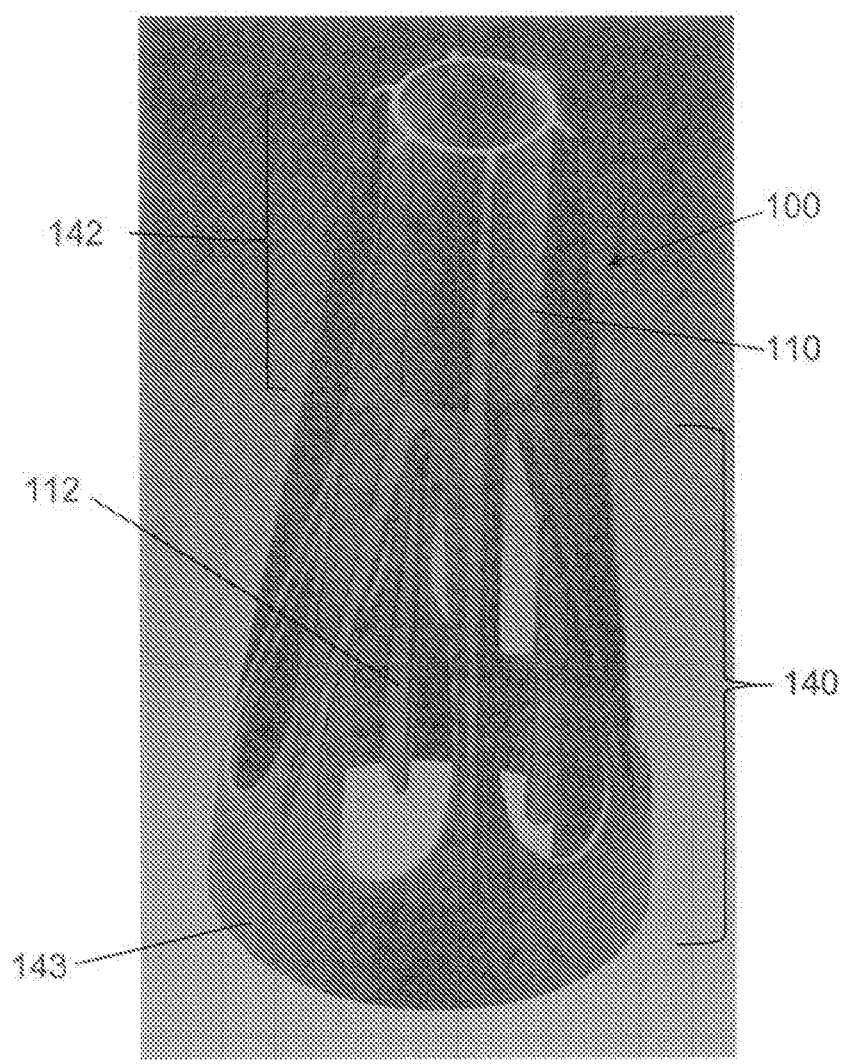
FIG. 11 is a perspective view of a different water heater tank anode support device.
Figure 12:
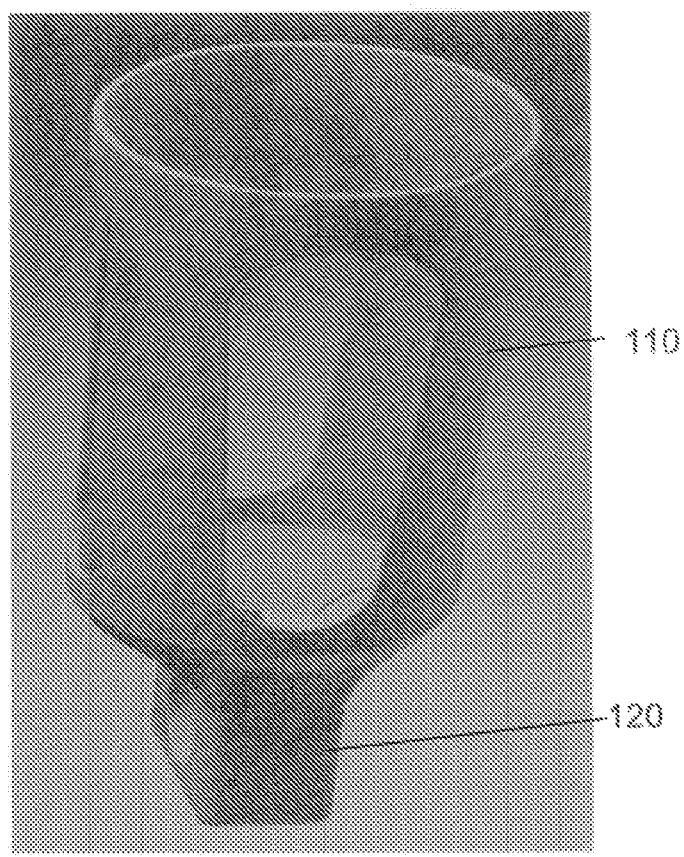
FIG. 12 is a perspective view of a different water heater tank anode support device.

The anode support device 100 alternatively has a cage or mesh construction or structure, e.g. as shown in FIGS. 11 and 12. As shown in FIG. 11, the anode engaging portion 110 is a skeletal or cage like structure. Internal ribs or longitudinal fins 112 provided in the anode engaging portion 110 to guide the anode (not shown) toward the centre of the anode support device The open spaces within the mesh or cage are preferably dimensioned to prevent the anode from being caught by the mesh or cage, or passing through and open spaces. The anode holding portion can also have an at least partially open end adjacent said tank engagement formation.

The anode support device 100 is not limited to the funnel shape. For example, the mouth portion 140 can take the shape of a semi-sphere or semi-ellipsoid, a frusto-cone, a pyramid with flat or curved lateral faces, a triangular-based pyramid with flat or curved lateral faces, a polygon-based pyramid with flat or curved lateral faces. Examples are depicted in FIGS. 17A to 17F. In some embodiments, the mouth portion 140 and neck portion 142 are interchanged. The embodiment shown in FIG. 11 is an example. In the embodiment shown in FIG. 12, the anode engaging portion 110 is generally cylindrical.

In the embodiment shown in FIG. 11, the neck portion 140 is operatively located closer to the upper assembly of the tank, and generally diverges toward the mouth portion which is operatively located closer to the base 300. The mouth 140 can also generally have a decreasing width as measured across a longitudinal axis of the anode support device 100, toward the neck portion 142. In the embodiment shown in FIG. 11, the mouth portion 140 ends in a rim 143 which engages the base 300 of the tank.

Figure 14:
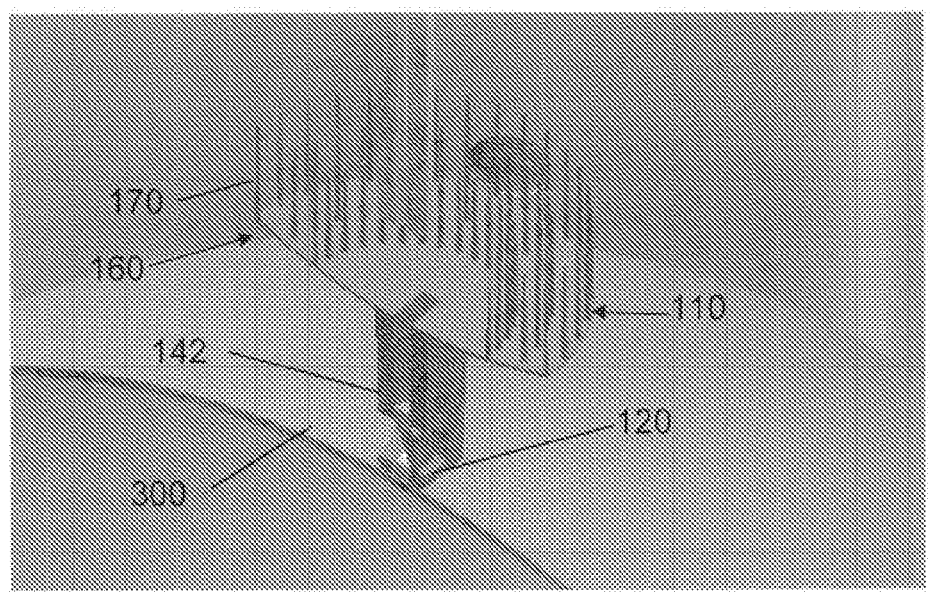
FIG. 14 is a perspective view showing the water heater tank anode support device depicted in FIG. 13 attached to a tank base.
Figure 13:
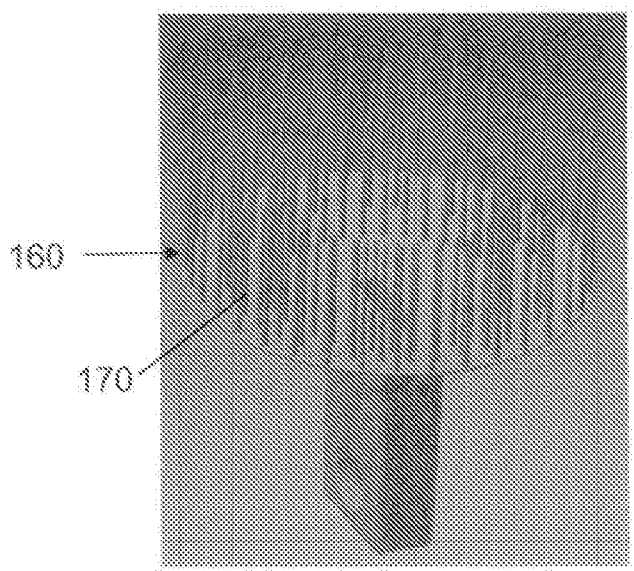
FIG. 13 is a perspective view of a different water heater tank anode support device which has a brush portion.

In further embodiments, the anode engaging portion 110 can have a brush structure. For example, as shown in FIGS. 13 and 14, the mouth portion 160 includes a number of bristles 170 which are of sufficient stiffness, and arranged to be close enough to receive the suspended end of the anode and prevent the anode from falling through the brush portion 160. As shown in FIG. 13, the plurality of bristles 170 can be arranged in concentric circles.

Figure 16:
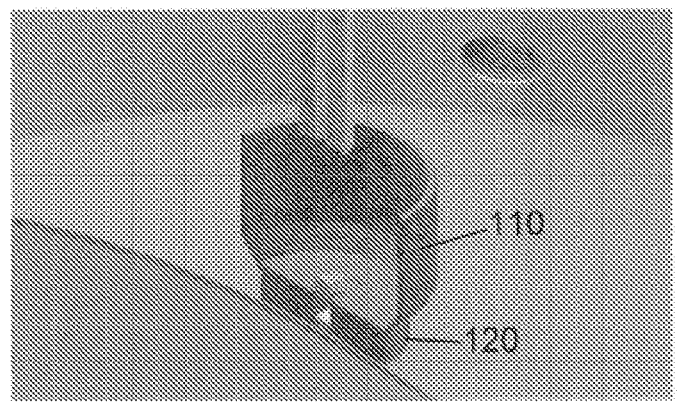
FIG. 16 is a perspective view showing the water heater tank anode support device depicted in FIG. 15 attached to a tank base.
Figure 15:
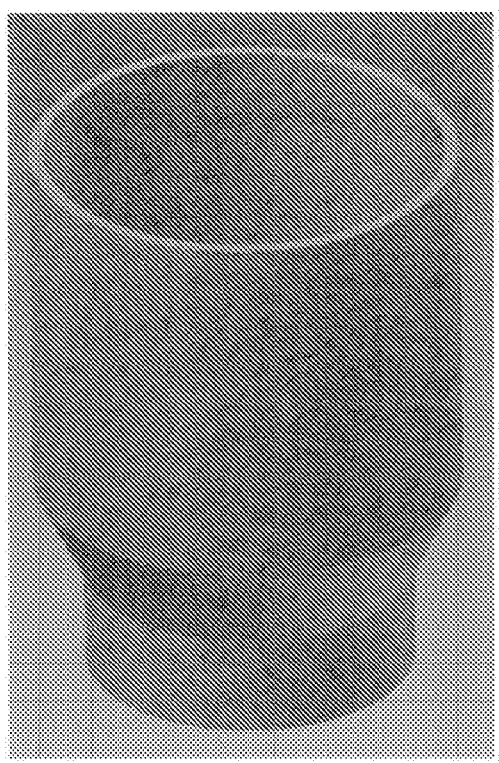
FIG. 15 is a perspective view of a different water heater tank anode support device which is an enclosed cylinder that has no apertures.

FIGS. 15 and 16 depict a further embodiment the anode engaging portion 110 is generally cylindrical and has no apertures.

The water heater tank anode support device 100 therefore enables a method of supporting an anode in a water storage tank, where a free end of the anode is limited in its movement by interaction with a base of the tank. The preferred design clips onto a formation such as a loop or a bracket attached to the bottom end by pushing in one direction. It does not require any fasteners or twisting operations to secure the anode support. In operation, the support device supports the anode. The support device can but does not necessarily have to, align with the anode.

To assemble a water storage tank which includes the anode and the herein described anode support, an anode is attached to an upper assembly of the tank. An anode support is attached to the base of the tank. In the process of assembling the upper assembly and the base toward each other, the anode support is aligned with the suspended end of the anode. By assembling the base and the upper assembly toward each other, the free end of the anode is inserted into the anode support, and preferably secured by the anode engaging portion. Finally the base and the upper assembly are joined to complete the water heater tank assembly.

The method of assembling the water storage tank is modified for a device 100 of the type shown in FIG. 11. In the modified method, the device 100 is attached to the suspended end 12 of the anode 10. The base 300 of the tank is then assembled with the upper assembly 14, so that the device 100 is fit over the formation 200 on the tank's base 300. The rim 143 of the device 100 acts as the tank engaging formation. The support or locator device 100 has a length that allows the rim 143 of the device 100 to at least reach and surround the formation 200. If the rim 143 surrounds the formation 200 but does not reach the base 330 when the tank is assembled, the magnitude of the anode's oscillation due to any vibration or other forces is limited by the distance that the rim 143 is allowed to move before it is captured by the formation 200. If the support or locator device 100 is longer so that when the tank is assembled, the rim 143 is located or pushed against the base 300, the interference between the rim 143 and the base 300 further locates the anode 10 and limits its movements.

As mentioned above, due to variances in manufacturing, the anode can be centrally located with respect to the upper assembly, or be offset from the centre. If the anode is centrally located with respect to the upper assembly, the anode support device is preferably also centrally located with respect to the base. If the anode is offset from the centre of the upper assembly, the anode support device is preferably likewise located away from a centre of base, to generally align with the anode during assembly. However, as mentioned above, a strict alignment between the anode and the anode support device is not required.

The water heater tank anode support device 100 can be moulded from an elastically deformable plastic material or another elastomer, or another elastically deformable material that preferably does not react with water.

Other constructions can include a threaded fitting mounted to the tank minus and, with the base of the next of the support including a mating thread to interlock the support to the base.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A water heater tank anode support device for an anode having a first end affixed to a wall of a water heater tank, the water heater tank anode support device having an anode engaging portion to engage a second end of said anode, the anode engaging portion having a mouth portion and a neck portion, the mouth portion converging toward the neck portion, a passage being defined between the mouth portion and the neck portion, and a tank engaging formation for operatively engaging a base of the water heater tank, wherein the passage leads toward said tank engaging formation.

2. The water heater tank anode support device as claimed in claim 1, wherein the tank engaging formation includes a sleeve sized and shaped to fit onto a fitting attached to said base.

3. The water heater tank anode support device as claimed in claim 2, wherein said tank engaging formation is able to be elastically deformed while being mounted to said fitting, returning to its original shape once engagement is complete.

4. The water heater tank anode support device as claimed in claim 3, said tank engaging formation including two sides spaced apart for the fitting to be accommodated therebetween, the two sides each having an internal shoulder formation extending interiorly, the internal shoulder formations being aligned with and extending toward each other, the internal shoulder formations being pushed apart from each other as they are passed over said fitting, then returning to their original positions to prevent the fitting from exiting the tank engaging formation.

5. The water heater tank anode support device as claimed in claim 4, wherein said internal shoulder formation is one of: a rounded or curved formation, and a barb-shaped formation having a tapered edge and a squared edge.

6. The water heater tank anode support device as claimed in claim 1, further including at least one of:
a reinforcing formation adjacent said tank engaging formation to reinforce it; and
a web provided around said tank engaging formation.

7. The water heater tank anode support device as claimed in claim 1, wherein an inner diameter of the neck portion decreases toward the tank engagement formation.

8. The water heater tank anode support device as claimed in claim 1, the mouth portion having a shape that is at least one of the following: a semi-sphere or semi-ellipsoid, a frusto-cone, a pyramid with flat or curved lateral faces, a triangular-based pyramid with flat or curved lateral faces, a polygon-based pyramid with flat or curved lateral faces.

9. The water heater tank anode support device as claimed in claim 1, wherein the mouth and neck portion are each constructed from at least one of: a substantially enclosed surface; a substantially open structure; a funnel type structure; and a skeletal or mesh or cage type structure.

10. The water heater tank anode support device as claimed in claim 1, wherein the neck portion is generally cylindrical or tubular.

11. The water heater tank anode support device as claimed in claim 1, comprising one or more aperture in said water heater tank anode support device, so that moving particulate can pass there-through.

12. The water heater tank anode support device as claimed in claim 1, wherein the anode engaging portion includes internal longitudinal ribs provided around and extending from an inner surface of said anode engaging portion, the internal longitudinal ribs defining an inner diameter of the anode engaging portion.

13. The water heater tank anode support device as claimed in claim 1, wherein the anode engaging portion has at least one through aperture adjacent said tank engagement formation.

14. A method comprising supporting an anode in a water storage tank, wherein the anode comprises a free end supported by a base of the water storage tank and a fixed end configured to a wall of the water storage tank opposite of the base.

15. The method as claimed in claim 14, wherein the base has attached to it a water heater tank anode locator device, the water heater tank anode locator device being aligned with and locating the anode.

16. A method of assembling a water storage tank, the method including attaching an anode to an upper assembly of the water storage tank, attaching an anode support or locator device to a base of the water storage tank, aligning the anode support or locator device with the anode, assembling the base and the upper assembly whereby a free end of the anode is inserted into the anode support or locator device, joining the base to the upper assembly.

17. The method as claimed in claim 16, wherein the anode is centrally located with respect to the upper assembly, and the anode support or locator device is centrally located with respect to the base.

18. The method as claimed in claim 16, wherein the anode is offset from a center of the upper assembly, and the anode support or locator device is likewise offset from the center of the base, to generally align with the anode during assembly.

19. The method as claimed in claim 16, wherein the anode support or locator device is a support device.

* * * * *